United States Patent
Wissmach et al.

(10) Patent No.: US 6,741,050 B2
(45) Date of Patent: May 25, 2004

(54) METHOD OF CONTROLLING AND SWITCHING FOR BRAKING AN ELECTRONICALLY COMMUTATED ELECTRICAL MOTOR

(75) Inventors: Walter Wissmach, München (DE); Rudolf Bauer, Erpfting bei Landsberg am Lech (DE); Vilmos Török, Compione d'Italia (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/197,075

(22) Filed: Jul. 16, 2002

(65) Prior Publication Data

US 2003/0052632 A1 Mar. 20, 2003

(30) Foreign Application Priority Data

Jul. 16, 2001 (DE) .......................................... 101 34 454

(51) Int. Cl.⁷ .............................. H02K 7/10; H02P 1/22; H02P 3/00; H02P 3/18
(52) U.S. Cl. ........................ 318/362; 318/365; 318/273; 318/757; 318/703; 318/86; 388/937
(58) Field of Search ................................. 318/362, 363, 318/365, 369, 376, 275, 273, 757–761, 703, 86, 87; 388/932, 937

(56) References Cited

U.S. PATENT DOCUMENTS

| | | | | |
|---|---|---|---|---|
| 4,438,377 A | * | 3/1984 | Sakai et al. | 318/369 |
| 5,220,257 A | * | 6/1993 | Yoshino et al. | 388/932 |
| 5,235,261 A | * | 8/1993 | Philipp | 388/937 |
| 5,371,448 A | * | 12/1994 | Gleim | 318/368 |
| 6,373,207 B1 | * | 4/2002 | Yablonovitch | 318/362 |

FOREIGN PATENT DOCUMENTS

| | | | | |
|---|---|---|---|---|
| DE | 4311533 A1 | * | 1/1994 | H02P/6/02 |
| DE | 4333733 A1 | * | 4/1995 | H02P/3/08 |
| DE | 19518991 A1 | * | 1/1997 | H02P/6/08 |
| DE | 19949804 A1 | * | 5/2000 | H02P/6/24 |
| EP | 534761 A1 | * | 3/1993 | H02P/7/00 |
| JP | 55053195 A | * | 4/1980 | H02P/7/62 |
| JP | 62018984 A | * | 1/1987 | H02P/3/18 |
| JP | 02211084 A | * | 8/1990 | H02P/3/24 |

* cited by examiner

Primary Examiner—Rina Duda
Assistant Examiner—Edgardo San Martin
(74) Attorney, Agent, or Firm—Sidley Austin Brown & Wood, LLP

(57) ABSTRACT

A control method and a switching circuit for braking an electronically commutated electrical motor, wherein operation is in a phase period (T) of an inverter relative to at lest one winding, sequentially, both in a motoring mode and a generating operating mode using various cycles ($t_1$–$t_2$, $t_3$–$t_4$) beginning with zero, such that the driving and braking torques associated with the cycles ($t_1$–$t_2$, $t_3$–$t_4$) produce a resultant braking moment averaged over the phase period (T).

13 Claims, 2 Drawing Sheets

METHOD OF CONTROLLING AND SWITCHING FOR BRAKING AN ELECTRONICALLY COMMUTATED ELECTRICAL MOTOR

BACKGROUND OF THE INVENTION

The invention discloses a method for controlling and switching for braking an electronically commutated electrical motor, in particular, a switched reluctance motor used as the drive in a hand tool device.

Electronic reluctance motors are used, in hand tool devices, as small-volume drives with high outputs that must be quickly braked, by the user, after shut-off.

Such electronically commutated electrical motors, for example, include brushless d.c. motors, permanent-magnet synchronous motors, asynchronous motors and switched reluctance (SR) motors. These motors consist of a rotatably mounted rotor with a plurality of poles comprising permanent-magnetic or low-magnetic material and a stator with a plurality of pole shoes and windings supplied with a magnetic flux, which are temporally coupled conductingly during a rotor cycle with a voltage source via an inverter. The inverter is controlled relative to a desired value by the control and regulation electronics of a microcontroller. The microcontroller is coupled to suitable sensors for determining the rotor angle.

A rotor cycle produces either a drive or a braking moment as a result of the direction of the current and the switch-on or switch-off points during a phase period. In SR motors the inverter is conventionally configured as a semi-bridge since the current flows, in a single direction, through the windings in a motor and a generating mode of operation. An intermediate circuit is frequently arranged between a static converter on the mains side and an inverter on the load side, wherein an intermediate circuit capacitor serves as a short-term energy storage.

In a short-circuit or a free-wheeling mode, the rotational energy is conventionally converted into electrical current heat in the rotor or in the stator or, in a generator mode, the rotational energy is fed back into the intermediate circuit or into the power lines, or converted into electrical current heat in a separate braking resistor. Additional components such as the braking resistor in addition to the required circuit breaker switch[es] and the control electronics, and excessively high operational parameters such as short circuit currents, in the windings, in the stator or magnetic field forces, in the rotor, are a drawback for quick braking.

DE 19949804A1 discloses a brushless d.c. motor with a permanent-magnet rotor that has three angularly offset Hall sensors, three windings and a converter such as a full bridge with parallel free-wheeling diodes for three bridge limbs between a static converter, a voltage intermediate circuit with an intermediate circuit capacitor and a current measuring resistor. At variable load and rotations, control is effected via a synthetic motor model in the microcontroller such that the d.c. voltage supplied to the electrical motor is in a predetermined relation to the voltage induced in the electrical motor and the electrical motor is operated in an appropriate operational mode. In the operational mode used for braking, the possibility of unacceptably high intermediate circuit voltage that could damage the inverter or the electrical motor is limited by an additional control circuit. The drawback in this proposed solution is the very minimal braking torque in the current and the voltage-end limited generator mode.

DE 4311533A1 discloses a control method for a brushless d.c. motor that supports the differently prioritized and combined motor functions: commutation, controlled clocking; chopping; switching of motor operations to unclocked generator operation. The drawback to this proposed solution is the unacceptably high power dissipation that could result in damage to the inverter or to the electrical motor.

According to EP 534761B1, in a method for operating an electrically commutated SR motor, the motor is driven at high rotational speed in continuous current operation such that the points in time of switching for the conduction time are expanded over a half phase period duration and controlled over several cycles of phase period.

According to DE 3721477, one winding is operated in a motor and simultaneously another winding is operated in a generator operation for precise control of the speed of tape recorder devices with an electronically commutated electrical motor, wherein both magnetic fields overlap. This solution is not suitable for quick braking.

According to DE 19518991, a method for quick switching between a short-circuit operation (depending on the precision of the bridge limb is opened or closed) and a generator operation is disclosed for operating an electronically commutated electrical motor within a phase period, whereby, on the one hand, the intermediate circuit is supplied with voltage and, on the other hand, either the braking current or the intermediate circuit voltage is controlled at a maximum allowable level. The drawback to this solution is the very low braking torque in the current- and voltage-limited generator operation.

Further, according to EP 534761B1, in a method for operating an electrically commutated SR motor, the motor is driven at a high rotational speed in a continuous current operation such that the switching points for the conduction time are expanded over a half phase period duration and controlled over several cycles of the phase period.

SUMMARY OF THE INVENTION

The object of the present invention is to provide a method and switching for braking an electronically commutated electrical motor without additional braking devices and without excessively high operating parameters.

Said object is generally achieved by the invention. In general, in a method for braking an electronically commutated electrical motor using an inverter controlled by a microcontroller, the inverter is operated, within a phase period of the inverter, relative to at least one winding, and driven in a motor operational mode and in a generator operational mode with cycles differing from zero, whereby the drive or braking torque associated with the cycles indirectly produce a final braking moment over a phase period.

The current flowing in both operational modes, through the inverter and the winding in the stator, causes, by virtue of electrical current heat in the inverter and in the windings of the electrical motor and losses from the magnetic reversal in the rotor, spatially arranged and consequently distributed losses that should be maximized within acceptable current limit levels for operational parameters such that the electrical motor can be braked as quickly as possible.

Specifically, in a microcontroller control process and in the inverter coupled therewith for the purpose of braking an electrical motor:

in an initial step, the inverter is detected in the braking stage, and preferably shut-off by the user;

in a second step, the conventional motor mode ends, preferably, with a rotational speed and/or torque control, and is switched to a braking mode;

in further, periodically repeating steps, an initial cycle with a driving torque and a second cycle temporally offset thereto with a braking moment is generated that an averaged resultant braking moment is produced.

Advantageously, in a higher prioritized control loop, during the braking stage, the current forces, which are integrally delay-adapted by the windings, are limited within the cycle by a current limiting means. Moreover, the cycle is interrupted such that excessively high currents that could damage the inverter or the electrical motor are avoided.

Advantageously, during the motor cycle and during the generator cycle, a different current limit for limiting current is used such that the torques, which are averaged and assigned over a phase period, are separately controllable as parameters by quantitative variation of the assigned current limit values. Moreover, an acceptable maximal braking torque is constantly produced and control is simplified.

Advantageously, the intermediate circuit voltage, in an intermediate circuit, in a control loop prioritized using current limiting, during a braking stage, gradually increases integrally by induction and is limited to an acceptable voltage limit value. The intermediate circuit voltage, within the generating cycle, is limited by voltage limiting, by a continuous voltage controller to the voltage limit value used as the control parameter. As a result, an excessively high intermediate circuit voltage that could damage the inverter or the electrical motor is avoided.

The voltage controller for the intermediate circuit voltage is used advantageously for controlling the resultant braking moment averaged using a phase period, since the change of the intermediate circuit voltage averaged over a phase period in the intermediate circuit capacitor is a measure of the energy balance comprised of consumed and returned energy. The resultant braking torque can be easily controlled by the magnitude of the current limit value. The maximal braking torque is obtained as a maximal difference of both current limit values, between which one switches back and forth.

Advantageously, operation is a half phase period duration, during the braking stage, at higher rotational speeds of the electrical motor in a continuous current operation with individual cycles, such that the motor and generator cycle follow each other continuously, whereby the braking process can be used even at higher rotational speeds.

BRIEF DESCRIPTION OF THE DRAWINGS

The invention is more completely described using an advantageous exemplary embodiment and read together with.

DETAILED DESCRIPTION OF THE INVENTION

Figure 1:
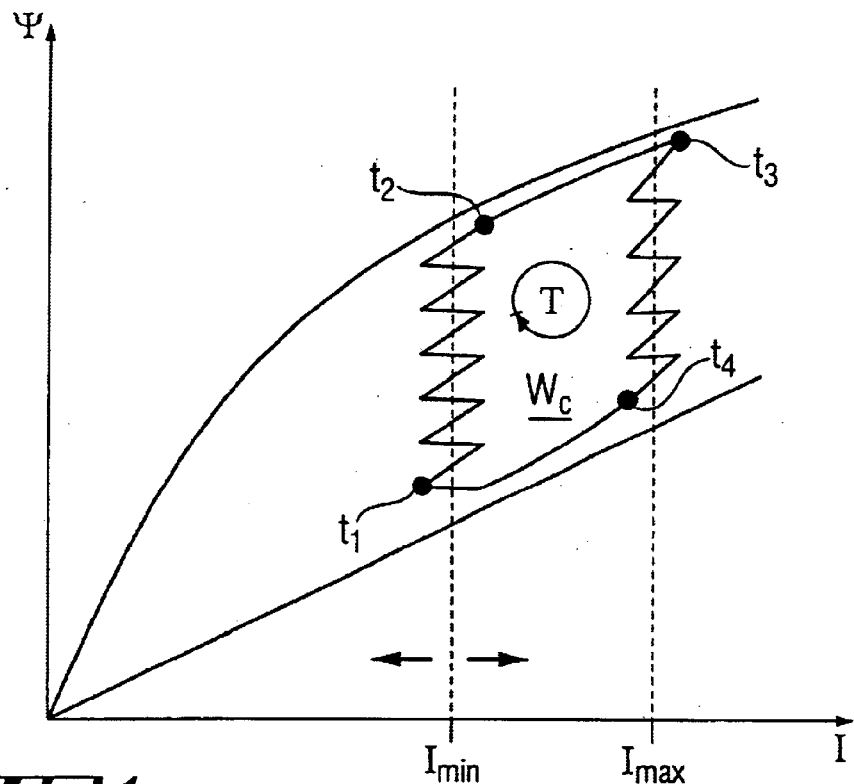
FIG. 1 is a diagram of a work-cycle of an SR motor, in accordance with the invention.

According to FIG. 1, the work cycle, of an SR motor with a motor cycle $t_1$–$t_2$ and a generating cycle of $t_3$–$t_4$ relative to the magnetic flux $\psi$ using the current I through a winding during the phase period T, exhibits a current-continuous cycle moving clockwise, whose enclosed area $W_c$ is a measure for the braking energy. The on- and off-switch times $t_1, t_2, t_3, t_4$ of the cycle are controllably assigned to particular rotor angle positions by the microcontroller. An initial current limit value $I_{max}$, corresponding to the maximum allowable current I through a winding, limits the current in the generator cycle $t_3$–$t_4$ by interrupting the current. A second, lower current limit value $I_{min}$, varied as a parameter, limits the current in the motor cycle $t_1$–$t_2$ by interrupting the current.

Figure 2:
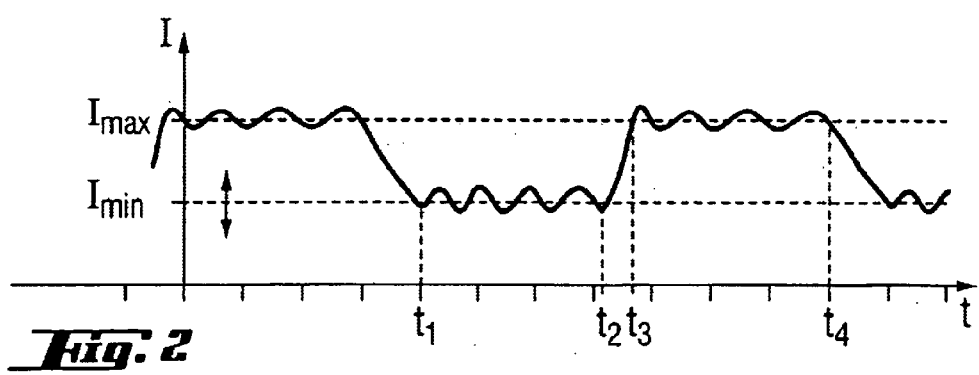
FIG. 2 is a diagram of a current-time of an SR motor, in accordance with the invention.

According to FIG. 2, the current-time diagram relative to the current I through a winding exhibits a temporally continuous transition of the motor cycle $t_1$–$t_2$ to the generator cycle $t_3$–$t_4$, whereby the current I is limited, during the generating cycle $t_3$–$t_4$, by the maximum allowable current limit value Imax and, during the motor cycle $t_1$–$t_2$, is limited by the variable lower current limit value $I_{min}$.

Figure 3:
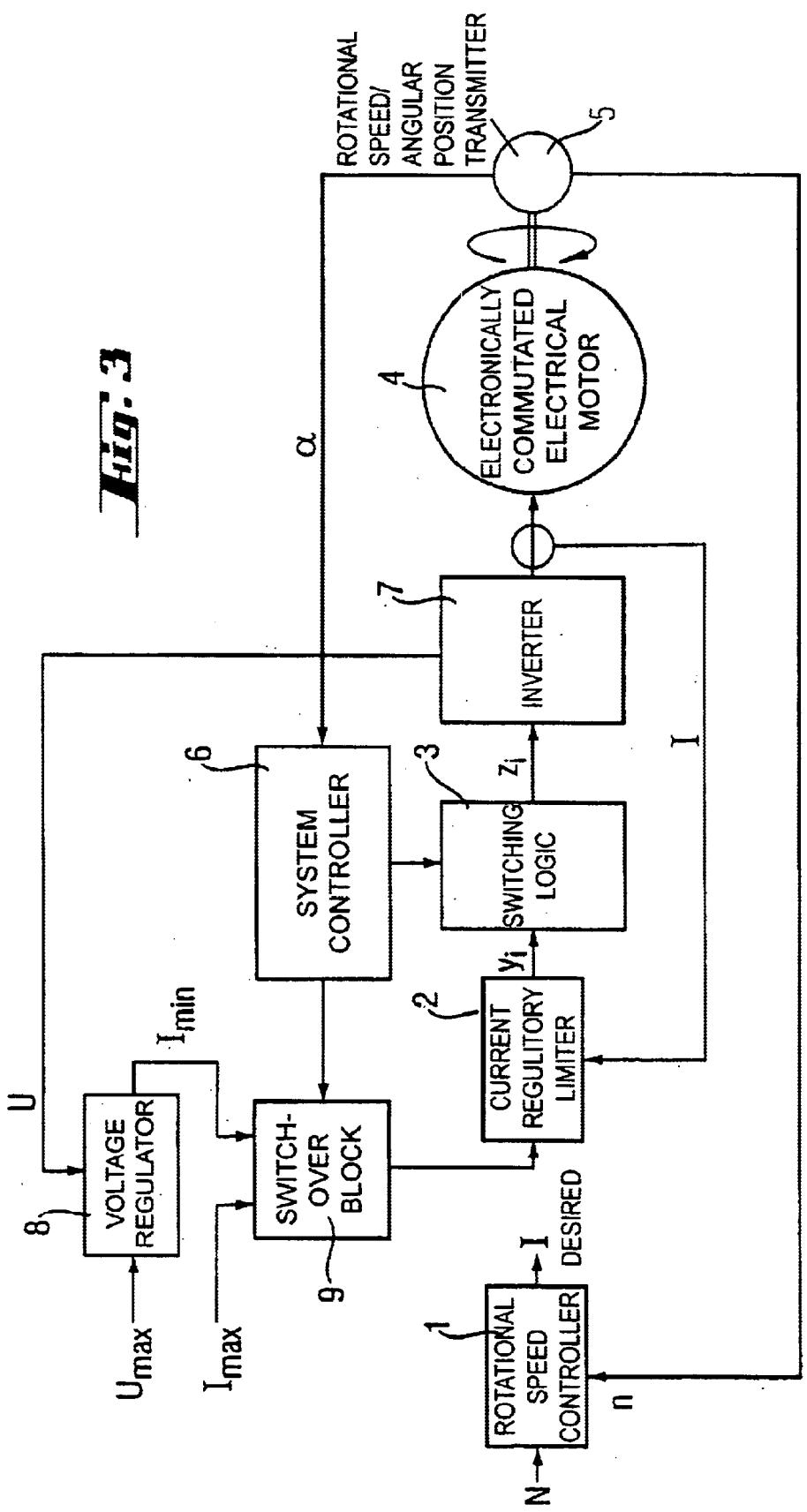
FIG. 3 is an exemplary embodiment of the main control and regulation switch circuits of a drive system of an electronically commutated electrical motor, in accordance with the invention.

FIG. 3 represents a switching circuit of a drive system of an electronically commutated electrical motor 4. The motor is driven at an inverter 7 that receives its control signals $Z_i$ from a switching logic 3, as part of a microcontroller. The switching logic 3 also processes control signals that it receives from the superordinate system controller 6 and the signals it receives from the current regulator/current limiter 2. The current regulator 2 picks up the current I through a winding, compares it to a current limit value $I_{min}$, $I_{max}$ determined by the system controller 6 and, if necessary with a desired current value $I_{desired}$ and derives, by implementing a control method, the corresponding control signals $y_1$. The desired current value is provided by a superimposed rotational speed controller 1. The rotational speed controller 1 receives the actual rotational speed value n from a rotational speed or angular position transmitter 5 and receives the desired rotational speed N, for example, from the system controller 6. The superimposed system controller 6 picks up, in addition to other system values that are not described in detail here, the rotor angle $\alpha$ and/or the actual rotational speed n of the electrical motor and the intermediate circuit current U. Then, the rotor angle $\alpha$ can be reliably estimated from the actual rotational speed and the time, and vice-versa. In addition, this circuit has an upper initial current limit value $I_{max}$ for the current I through a winding and a voltage regulating circuit for limiting the intermediate circuit voltage U. The voltage regulating circuit is comprised of the voltage regulator 8, which compares a fixed predetermined maximum allowable voltage $U_{max}$ to the intermediate circuit voltage U and, depending on the results of the comparison, generates a second lower current limit value such that $I_{min}$ is greater and counters the fixed predetermined upper initial current limit value $I_{max}$, if U becomes greater than the maximum value $U_{max}$. The two current limit values $I_{min}$ and $I_{max}$ are supplied to a switch-over block 9 which, depending on the output quantity of the system controller 6 and the method described above, alternately transfers one of the two current limit values $I_{min}$, $I_{max}$. During the described braking process, the rotational speed controller 1 is out of service; consequently, the output quantity $I_{desired}$ continues unused, which in normal motor operation is coupled with the desired value input of the current regulator 2.

Although, the exemplary embodiment refers to an SR motor, the method can be applied to other electronically commutated electrical motors by a person skilled in the art with minor modification.

What is claimed is:

1. A control method for braking an electronically commutated electrical motor (4) using an inverter (7) controlled by a microcontroller, comprising the steps of: operating the inverter (7) within a phase period (T) relative to at least one winding, sequentially, in a motoring mode and a generating mode, in various cycles ($t_1$–$t_2$, $t_3$–$t_4$) each unequal to zero; obtaining both of a driving torque and a braking torque associated with the cycles ($t_1$–$t_2$, $t_3$–$t_4$); and producing a resultant braking torque averaged over the phase period (T).

2. The control method of claim 1, further comprising the following steps:

detecting the change of the inverter, in a braking stage; terminating the motoring mode and switching to the generating mode and then in periodically repeating steps:

generating an initial cycle ($t_1$–$t_2$) with a driving torque and a second cycle ($t_1$–$t_2$, $t_3$–$t_4$) temporally offset from the initial cycle ($t_1$–$t_2$) with a braking torque to produce a resultant braking torque averaged over the phase period (T).

3. The control method of claim 2, wherein the step of detecting further includes the step of detecting the shut-off by the user.

4. The control method of claim 2, wherein the step of terminating comprises the step of terminating the motoring mode with at least one of a rotational speed and a torque regulation.

5. The control method of claim 2, in a higher prioritized control loop during the braking stage, comprising the steps of limiting the delayed integral adjustment of the current (I) by the winding, within the cycle ($t_1$–$t_2$, $t_3$–$t_4$), by a current limiter to a current limit value ($I_{min}$, $I_{max}$), and interrupting the cycle ($t_1$–$t_2$, $t_3$–$t_4$).

6. The control method of claim 1, during the motoring cycle ($t_1$–$t_2$) and during the generating cycle ($t_3$–$t_4$), comprising the step of using a different current limit value ($I_{min}$, $I_{max}$) for current limiting.

7. The control method of claim 6, during the motoring cycle ($t_1$–$t_2$) and during the generating cycle ($t_3$–$t_4$), further comprising the step of using only a quantitatively low current limit value ($I_{min}$) as a control parameter.

8. The control method of claim 2, further comprising the step of, using current limiting, in an intermediate circuit, in a control loop prioritized during the braking stage to delay an intermediate circuit voltage (U) by the integral effect of induction to an acceptable voltage limit value ($U_{max}$).

9. The control method of claim 8, comprising the step of using a continuous voltage regulator (8), within the generating cycle ($t_3$–$t_4$), for limiting the intermediate circuit voltage (U) to a quantitatively lower current limit value ($I_{min}$) as a control parameter.

10. The control method of claim 9, comprising the step of using the voltage regulator (8) for the intermediate circuit voltage (U) for controlling the resulting braking torque averaged over a phase period (T).

11. The control method of claim 2, comprising the step of providing a continuous current operation with individual cycles ($t_1$–$t_2$, $t_3$–$t_4$) over a half phase period (T), during the braking stage, at higher rotational speeds of the electrical motor (4), such that the motoring and generating cycle ($t_1$–$t_2$, $t_3$–$t_4$) follow each other temporally continuously.

12. A switching circuit for a control method for braking an electronically commutated electrical motor (4) using an inverter (7) controlled by a microcontroller, wherein the inverter is operated within a phase period (T) relative to at least one winding, sequentially, in a motoring mode and a generating mode for various cycles ($t_1$–$t_2$, $t_3$–$t_4$) each unequal to zero, wherein one of a driving torque and a braking torque associated with the cycles ($t_1$–$t_2$, $t_3$–$t_4$) produces a resultant braking torque averaged over the phase period (T), comprising a switch-over block (9) for a plurality of current limit values ($I_{min}$) and ($I_{max}$) connected with a system controller (6) and a current regulator (2).

13. The switching circuit of claim 12, comprising a voltage control (8) connected to an intermediate voltage (U) and an input for one of the current limit values ($I_{min}$) of the switch-over block (9).

* * * * *